United States Patent
Magnes et al.

(10) Patent No.: US 9,905,874 B2
(45) Date of Patent: *Feb. 27, 2018

(54) ADDITIVES FOR HYDROGEN/BROMINE CELLS

(71) Applicant: BROMINE COMPOUNDS LTD., Beer Sheva (IL)

(72) Inventors: Ben-Zion Magnes, Meitar (IL); Eli Lancry, Ashdod (IL); Mira Bergstein-Freiberg, Omer (IL); David Itzhak, Tel Aviv (IL); Yasmin Herscovitz-Levy, Kfar Saba (IL); Vered Atiya-Zuckerman, Ashkelon (IL)

(73) Assignee: BROMINE COMPOUNDS LTD., Beer Sheva (IL)

( * ) Notice: Subject to any disclaimer, the term of this patent is extended or adjusted under 35 U.S.C. 154(b) by 461 days.

This patent is subject to a terminal disclaimer.

(21) Appl. No.: 14/210,976

(22) Filed: Mar. 14, 2014

(65) Prior Publication Data
US 2014/0302408 A1    Oct. 9, 2014

Related U.S. Application Data

(63) Continuation-in-part of application No. PCT/IL2012/000349, filed on Sep. 23, 2012.
(Continued)

(51) Int. Cl.
*H01M 8/18* (2006.01)

(52) U.S. Cl.
CPC .... *H01M 8/188* (2013.01); *H01M 2300/0002* (2013.01); *Y02E 60/528* (2013.01)

(58) Field of Classification Search
None
See application file for complete search history.

(56) References Cited

U.S. PATENT DOCUMENTS

| 4,064,324 A | 12/1977 | Eustace |
| 4,065,601 A * | 12/1977 | Ajami ................ H01M 12/085 429/105 |

(Continued)

FOREIGN PATENT DOCUMENTS

| CN | 101003510 | 7/2007 |
| CN | 101492423 | 7/2009 |

(Continued)

OTHER PUBLICATIONS

Office Action issued in Chinese Patent Application No. 201280057395.8, dated Sep. 7, 2015 (with English translation).
(Continued)

*Primary Examiner* — Maria Laios
(74) *Attorney, Agent, or Firm* — Nixon & Vanderhye P.C.

(57) ABSTRACT

The invention relates to the use of 1-alkyl-2-alkyl pyridinium halide (e.g., 1-ethyl-2-methyl pyridinium bromide), 1-alkyl-3-alkyl pyridinium halide (e.g., 1-ethyl-3-methyl pyridinium bromide) or 1-alkyl-3-alkyl imidazolium halide (e.g., 1-butyl 3-methyl imidazolium bromide) as additives in an electrolyte used in hydrogen/bromine cells, for complexing the elemental bromine formed in such cells. The invention also provides an electrolyte comprising aqueous hydrogen bromide and said additives, and processes for operating an electrochemical flow cell selected from the group consisting of hydrogen/bromine or vanadium/bromine cells.

8 Claims, 2 Drawing Sheets

Related U.S. Application Data

(60) Provisional application No. 61/537,622, filed on Sep. 22, 2011, provisional application No. 61/781,141, filed on Mar. 14, 2013.

(56) References Cited

U.S. PATENT DOCUMENTS

| | | | |
|---|---|---|---|
| 4,510,218 | A | 4/1985 | Ando et al. |
| 4,520,081 | A | 5/1985 | Höhne et al. |
| 4,631,240 | A | 12/1986 | Walsh |
| 4,906,342 | A | 3/1990 | Takahashi et al. |
| 5,260,148 | A | 11/1993 | Idota |
| 5,591,538 | A | 1/1997 | Eidler et al. |
| 5,601,943 | A * | 2/1997 | Eidler ................. H01M 12/085 429/101 |
| 6,025,457 | A | 2/2000 | Ohno et al. |
| 2001/0028977 | A1* | 10/2001 | Kazacos ............. B60L 11/1879 429/105 |
| 2003/0165737 | A1* | 9/2003 | Nakagawa ............ H01M 4/485 429/188 |
| 2011/0233532 | A1* | 9/2011 | Sotzing ..................... C25B 3/00 257/40 |
| 2011/0253553 | A1 | 10/2011 | Bergstein Freiberg et al. |
| 2014/0262818 | A1 | 9/2014 | Ben-David et al. |

FOREIGN PATENT DOCUMENTS

| | | |
|---|---|---|
| CN | 102049202 | 5/2011 |
| EP | 0 404 188 | 12/1990 |
| JP | 11-509035 | 8/1999 |
| WO | WO 2013/042103 | 3/2013 |
| WO | WO 2013/042109 | 3/2013 |
| WO | WO 2013/168145 | 11/2013 |

OTHER PUBLICATIONS

Abstract of Shlyapnikov, D.S. [Khimiya Geterotsiklicheskikh Soedinenii], (1972), (7), 966-9.
Shlyapnikov, D.S. Khimiya Geterotsiklicheskikh Soedinenii, 1972, (7), p. 966-969.
Bartlet et al; Syntheses et Proprietes D'Halogenures D'Ammonium Quaternaire Utilisables Comme Electrolytes, Journal de Chimie Physique et de Physio-Chimie Biologique, 1984, 81 (5), p. 349-354.
J. Ploquin et al., β-Dicéto énamines hétérocycliques: 2.(Pyridyl-4)-2 indanediones-1,3 C-et N-substituées, Journal of Heterocyclic Chemistry, 17, Jul. 1980; p. 997-1008.
P. Murrill, Halides and Perhalides of the Picolines, Journal of the American Chemical Society, 21, Jun. 19, 1899, p. 828-854.
International Search Report for PCT/IL2012/000349, dated Dec. 18, 2012.
Written Opinion of the ISA for PCT/IL2012/000349, dated Dec. 18, 2012.
Shlyapnikov, D.S. [Khimiya Geterotsiklicheskikh Soedinenii], (1972), (7), 966-9.
Murrill [Journal of the American Chemical Society, 21, p. 828-854 (1899)].
Ploquin et al [Journal of Heterocyclic Chemistry, 17, p. 997-1008 (1980)].
Barlet, R. et al [Journal de Chimie Physique et de Physico-Chimie Biologique (1984), 81 (5), 349-54].
Nishida et al., "Physical and electrochemical properties of 1-alkyl-3-methylimidazolium tetrafluoroborate for electrolyte," *Journal of Fluorine Chemistry*, 2003, vol. 120, pp. 135-141, Elsevier Science B.V.
Extended European Search Report issued in European Application No. 12833458.8 dated Mar. 30, 2015.
Butler et al., "Zinc/Bromine Batteries," *Advanced Battery Systems*, Chapter 37, pp. 37.1-37.3 (2000).
Cathro et al., "Selection of Quaternary Ammonium Bromides for Use in Zinc/Bromine Cells," *Journal of Power Sources*, vol. 18, pp. 349-370 (1986).
Chinese Office Action issued in App. No. 201380023555.1 dated Mar. 3, 2016 (w/ partial translation.).
Couling et al., "Assessing the factors responsible for ionic liquid toxicity to aquatic organisms via quantitative structure—property relationship modeling," *Green Chemistry*, 2006, vol. 8, pp. 82-90.
Docherty et al., "Biodegradability of imidazolium and pyridinium ionic liquids by an activated sludge microbial community," *Biodegradation*, 2007, vol. 18, pp. 481-493.
Hashimoto et al., J. Amer. Cham, Soc, vol. 107, 1985, pp. 4655-4662.
International Search Report for PCT/IL2013/000049, dated Aug. 29, 2013.
International Search Report for PCT/IL2014/000010, dated Jun. 4, 2014.
Lukes et al., "Reduction of the Pyridine Nucleus with Formic Acod. III. Reduction of 3-Picoline", Chemicke Listy Pro Vedu a Prumysl, vol. 44, Dec. 31, 1950, pp. 297-300.
Shao et al., [Pige Huagong], 23, 2006, pp. 23-26.
U.S. Appl. No. 14/220,631, filed Mar. 20, 2014, Ben-David et al.
U.S. Appl. No. 14/399,106, filed Nov. 5, 2014, Magnes et al.
Waterkamp et al., Chem. Eng. & Tech 32 (11), 2009, pp. 1717-1723.
Written Opinion of the ISA for PCT/IL2013/000049, dated Aug. 29, 2013.
Written Opinion of the ISA for PCT/IL2014/000010, dated Jun. 4, 2014.
Australian Intellectual Property Office, "Patent Examination Report No. 1," issued in connection with Australian Patent Application No. 2014201398, dated Jan. 22, 2016.

\* cited by examiner

ADDITIVES FOR HYDROGEN/BROMINE CELLS

CROSS-REFERENCE TO RELATED APPLICATIONS

This application is a continuation-in-part (CIP) of International Application No. PCT/IL2012/000349 filed on Sep. 23, 2012, which claims the benefit of U.S. Provisional Application No. 61/537,622, filed on Sep. 22, 2011, the entire content of which is incorporated herein by reference. This application also claims the benefit of U.S. Provisional Application No. 61/781,141, filed on Mar. 14, 2013, the entire contents of all of which are incorporated herein by reference.

The invention relates to compounds suitable as additives for an electrolyte used in hydrogen/bromine cells, for complexing the elemental bromine formed in such cells.

There exists a need, in electrochemical flow cells which involve the generation of elemental bromine, to keep the bromine in a form which can be readily stored and pumped over a broad temperature range, such that it can be used without interfering with the operation of the flow cell.

The hydrogen/bromine cell is an example of a regenerative fuel cell. The operation of hydrogen/bromine regenerative fuel cells is based on the electrolysis of hydrogen bromide, and the conversion of the electrolysis products, i.e., hydrogen and elemental bromine, back to hydrogen bromide. During charge, an electric current supplied from an external source drives the electrolysis of hydrogen bromide, generating hydrogen ($H_2$) and elemental bromine ($Br_2$), which are stored separately in suitable tanks located externally to the cell. $H_2$ and $Br_2$ are fed back to the cell during discharge and are reacted to give hydrogen bromide, thereby producing electric energy.

A characteristic hydrogen/bromine cell is shown diagrammatically in FIG. 1. While this figure depicts a single cell, it is to be noted that a plurality of such cells can be assembled in series. Numerals 1 and 2 represent the hydrogen and bromine electrodes, respectively, and numeral 3 represents a separator (e.g. an ion exchange membrane) positioned between the electrodes. The term "hydrogen electrode" is used herein to indicate the electrode where hydrogen gas is formed (during charge) and oxidized (during discharge). The term "bromine electrode" is used herein to indicate the electrode where elemental bromine is formed (during charge) and reduced (during discharge).

A first storage tank, for collecting the hydrogen gas, is indicated by numeral 4. A second storage tank, which contains a concentrated aqueous solution of hydrogen bromide, is indicated by numeral 5. Flow paths 4a and 5c, connecting the hydrogen storage tank 4 and the HBr storage tank 5 to the respective sides of the cell, and pumps for driving the fluids along the flow paths are also shown in FIG. 1.

The charge/discharge cycle is represented by the following pair of chemical equations:

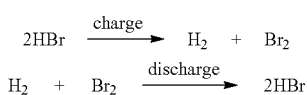

During charge, the electrolyte which comprises hydrobromic acid is fed from storage tank 5 to that side of the cell where the bromine electrode 2 is placed (which is the cathodic side of the cell at the charge state). The hydrobromic acid undergoes electrolysis, resulting in the formation of elemental bromine at the cathode. The electrolyte, enriched with elemental bromine, is removed from the cathodic side of the cell and is transferred to the storage tank 5. Hydrogen ions concurrently pass across the membrane 3 to the anodic side, where hydrogen gas evolves at the anode 1, and is collected in tank 4.

During discharge, the hydrogen gas and the bromine-containing electrolyte are fed from their storage tanks 4 and 5, respectively, to the respective sides of the cell, where the hydrogen and bromine electrodes are positioned (it is to be noted that the anodic/cathodic sides are reversed relative to previous stage). The reaction between hydrogen and bromine yields hydrobromic acid, with electric current being drawn from the cell.

It should be understood that the electrolyte, with which the electrolysis stage starts, is not necessarily free of elemental bromine. In practice, the electrolysis stage starts with an electrolyte which contains, in addition to hydrobromic acid, also up to 10% elemental bromine. For example, the concentrations of HBr and $Br_2$ in the aqueous electrolyte prior to the electrolysis may be from 5% to 52% (more preferably 10% to 45%) and from 0% to 10% (more preferably 0.1% to 5%), respectively. During the electrolysis stage (i.e., the charging process), the concentration of the hydrobromic acid in the electrolyte is gradually decreased, while the concentration of the elemental bromine increases. Upon completion of the charge state, the electrolyte typically comprises from 5% to 35% HBr and from 0.2M to 3.5M $Br_2$. It follows that the composition of the electrolyte varies significantly during the charge/discharge cycle.

Bromine is a dark red, fuming liquid. It is reactive and corrosive and has a high vapor pressure at room temperature. In cells utilizing bromine as an electrochemically active element, there is a need to deactivate the bromine, i.e., convert it into a form with reduced vapor pressure, which form is less likely to interfere with the operation of the cell. It is known in the art that this goal can be achieved by adding a bromine-complexing agent to the electrolyte. The bromine-complexing agent combines with bromine molecule(s) to form a polybromide complex. As a result, the vapor pressure above the complexed bromine solution is decreased.

In regenerative fuel cells the electrolyte reservoir is separated from the electrodes stack, with the electrolyte being pumped from the reservoir to the electrodes and back. The flowability of the electrolyte must be maintained with respect to different compositions corresponding to different states of charge, and over the entire operational temperature range (typically between −15° C. and 50° C.). In other words, throughout the operation of the cell, the formation of a solid phase in the electrolyte is unacceptable.

In the past, bromine complexing agents were investigated for the deactivation of elemental bromine in zinc bromine flow batteries. Bromine deactivation in these batteries may be achieved by the use of cyclic quaternary ammonium bromides (abbreviated quats) as complexing agents. In their most general form, these salts are represented by the following formula:

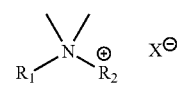

where $R_1$ and $R_2$ indicate the alkyl groups (which are generally different from one another) and X indicates the halide counter ion. It should be particularly noted that in this formula, the cation is a non-aromatic heterocyclic system. Specifically, N-methyl-N-ethyl pyrrolidinium bromide (abbreviated MEP) and N-methyl-N-ethyl morpholinium bromide (abbreviated MEM) are both commercially used for that purpose. However, the experimental results reported below indicate that neither N-methyl-N-ethyl pyrrolidinium bromide nor N-methyl-N-ethyl morpholinium bromide is suitable for use in hydrogen/bromine regenerative fuel cells, for the reason that they crystallize under certain working conditions employed in such cells.

It has now been found that 1-alkyl-2-alkyl pyridinium bromide, such as 1-ethyl-2-methyl pyridinium bromide (abbreviated 2-MEPy), 1-alkyl-3-alkyl pyridinium bromide, such as 1-ethyl-3-methyl pyridinium bromide (abbreviated 3-MEPy), and 1,3 dialkyl imidazolium bromide such as 1-butyl 3-methyl imidazolium bromide (abbreviated BMIBr) and mixtures thereof are effective as complexing agents for a hydrogen/bromine cells, e.g., a hydrogen/bromine regenerative fuel cell. Having tested HBr/bromine containing electrolytes with varied compositions corresponding to distinct states ensuing during the charge/discharge cycle of hydrogen/bromine cell, it has been surprisingly found that the presence of said compounds in the electrolyte allows the formation of polybromide complexes which do not solidify under the relevant working conditions.

Heretofore, 1-alkyl-2-methyl-pyridinium (also named N-alkyl picolinium) halide salts were proposed in the art for the following uses. U.S. Pat. No. 5,260,148, for example, describes the preparation of an electrolytic solution for lithium secondary batteries by adding N-methyl picolinium ions to a solvent which is an equimolar mixture of propylene carbonate and 1,2-dimethoxyethane. Barlet, R. et al. [Journal de Chimie Physique et de Physico-Chimie Biologique (1984), 81(5), 349-54] describes the use of pyridinium halides as room temperature battery electrolytes. EP 0404188 discloses a non-aqueous electrolytic aluminum plating bath composition comprising, inter alia, halide such as an N-alkyl picolinium halide. Shlyapnikov, D. S. [Khimiya Geterotsiklicheskikh Soedinenii (1972), (7), 966-9] describes $SO_2$ complexes with quaternary halide salts of e.g. α-picoline.

The present invention is therefore primarily directed to the use of 1-alkyl-2-alkyl pyridinium halide, 1-alkyl-3-alkyl pyridinium halide, 1,3 dialkyl imidazolium halide or their mixtures, wherein the halide is preferably bromide, as bromine complexing agents in electrochemical flow cells selected from the group consisting of hydrogen/bromine cell and vanadium/bromine cell. The alkyl groups attached to the aromatic ring are independently selected from the group of C1-C5 alkyl. Preferably, the alkyl groups are different from one another. In the case of 1-alkyl-2-alkyl pyridinium bromide and 1-alkyl-3-alkyl pyridinium bromide, it is preferred to have an ethyl group attached to the nitrogen atom and a methyl group attached to the carbon ring (i.e., either at the 2- or 3-position of the pyridine ring).

In another aspect, the invention provides an electrolyte suitable for use in electrochemical flow cells selected from the group consisting of hydrogen/bromine cell and vanadium bromine cell, said electrolyte comprising aqueous hydrogen bromide and a liquid complex composed of at least one of 1-alkyl-2-alkyl pyridinium halide (e.g., bromide), 1-alkyl-3-alkyl pyridinium halide (e.g., bromide) or 1,3 dialkyl imidazolium halide (e.g., bromide) combined with one or more bromine molecules. The liquid complex is preferably composed of 1-ethyl-2-methyl pyridinium bromide, 1-ethyl-3-methyl pyridinium bromide or 1-butyl 3-methyl imidazolium bromide and bromine molecules.

In another aspect, the invention is directed to a process for operating an electrochemical flow cell selected from the group consisting of hydrogen/bromine and vanadium bromine cell, comprising adding 1-alkyl-2-alkyl pyridinium halide (e.g., bromide), 1-alkyl-3-alkyl pyridinium halide (e.g., bromide), 1,3 dialkyl imidazolium halide (e.g., bromide) or their mixtures as set forth above, to the HBr-containing electrolyte of said cell.

The preferred complexing agents according to the invention, 1-ethyl-2-methyl pyridinium bromide and 1-ethyl-3-methyl pyridinium bromide are prepared by reacting 2-picoline or 3-picoline, respectively, with ethyl bromide, as illustrated by the following reaction schemes:

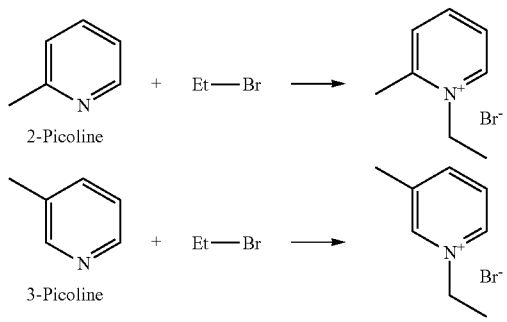

The reaction is carried out by charging a pressure reactor with the reactants and optionally also with a solvent, which may be either an aqueous or organic solvent. Alternatively, the reaction is solvent free, with one of the reactants being optionally used in excess. It is possible to introduce the entire amounts of the reactants into the reactor and then start the reaction by heating the reaction mixture. However, it is also possible to gradually feed one or more of the reactants (e.g., the ethyl bromide) into the reactor over a period of not less than one hour under heating.

The reaction mixture is heated, preferably to a temperature of not less than 90° C., and the reaction is allowed to proceed under pressure for a few hours. The product is conveniently collected in the form of an aqueous solution, which can be directly applied as an additive for the HBr electrolyte solution in accordance with the present invention. To this end, upon completion of the reaction, the organic solvent and/or residual amounts of the starting materials are removed from the reaction vessel by means of methods known in the art, e.g., distillation. Water can then be added into the reactor, to afford the complexing agent in an aqueous form. The concentration of the aqueous solution of 2-MEPy or 3-MEPY or their mixture which can be used as an additive for the HBr electrolyte is preferably from 50 to 90 wt %.

Another complexing agent suitable for use according to the invention, 1-butyl 3-methyl imidazolium bromide, is commercially available from Chemada Israel, and can be also prepared by methods known in the art.

The electrolyte according to the invention is prepared by combining together aqueous hydrogen bromide, the complexing agent, e.g., 1-ethyl-2-methyl pyridinium bromide, 1-ethyl-3-methyl pyridinium bromide, 1-butyl 3-methyl imidazolium bromide or a mixture thereof, and the electrochemically generated bromine, which is formed in-situ in the cell on charging, or chemically (e.g., peroxide) generated bromine. To an aqueous solution of hydrogen bromide, with HBr concentration of 5%-52% by weight, e.g., 10-45 wt %, will be added the complexing agent such that its concentration in the resulting solution is not less than 0.25M, up to a concentration capable of complexing the maximal bromine content. On charging, the hydrogen bromide is consumed and bromine is generated. On discharging, the aqueous phase of the electrolyte is again concentrated with respect to HBr, and the concentration of bromine is reduced.

As noted above, the bromine complexing agents of the invention may be used either in individual form or in the form of mixtures, e.g., binary mixtures, in which the molar ratio between the two components of the mixture may be from 1:5 to 5:1, more preferably from 1:4 to 4:1 and even more preferably, from 1:3 to 3:1. One preferred mixture consists of 1-ethyl-2-methyl pyridinium bromide and 1-ethyl-3-methyl pyridinium bromide in a molar ratio between 1:2 to 1:4. The complexing agents are preferably added to the electrolyte in the form of concentrated aqueous solutions in which the concentration of the complexing agent may be from 40 to 92% by weight, e.g., 65 to 90% by weight.

The process of the invention is carried out utilizing a hydrogen/bromine cell of the type described above with reference to FIG. 1, with the addition of the complexing agent into the storage tank used for holding the aqueous HBr (indicated by numeral 5 in FIG. 1). Another example of hydrogen/bromine cell which can be used in the process of the invention is illustrated in U.S. Pat. No. 4,520,081. Vanadium/bromine cells which can be operated according to the invention are illustrated, for example, in U.S. Pat. No. 7,320,844 or US 2006/0183016.

The invention also relates to a structural material suitable for use in the construction of hydrogen/bromine energy storage device. Such structural materials ought to exhibit a combination of high mechanical strength and good chemical resistance over broad range of working temperatures, due to the highly corrosive nature of the $HBr/Br_2$ aqueous electrolyte circulating in the cell. For example, in the usual construction of hydrogen/bromine energy storage device, a plurality of cells such as the one illustrated in FIG. 1 are assembled together adjacent to one another in a stack configuration to produce the desired voltage within the stack. Various parts of the hydrogen/bromine energy storage device, such as the tank used to hold the bromine-containing aqueous HBr electrolyte, and pipes used to supply and withdraw the reactants and reaction products to and from the cell stacks, are continually exposed to elemental bromine and hydrobromic acid, which are both corrosive substances. Therefore, structural materials in hydrogen/bromine energy storage device must be chosen carefully.

The problem of finding a structural material suitable for use in hydrogen/bromine-based systems was addressed in U.S. Pat. No. 4,520,081, where various materials for making the frame of the cell which surrounds the electrodes are considered, including inert plastics and specifically polytetrafluoroethylene, i.e., fluorine-containing polymers which are well known for their high chemical inertness. In U.S. Pat. No. 4,520,081, a modified form of graphite having a layer of pyrographite disposed on its surface was used for making the frames of the cells.

High density polyethylene (HDPE) is increasingly used as a structural material, for example in piping systems for gas distribution and water lines. However, HDPE is not considered as a structural material of choice in systems where exposure to bromine is expected to occur. Indeed, the experimental work conducted in support of this invention indicates that HDPE is incompatible with the electrolyte operable in hydrogen/bromine cells, as it is unable to withstand an attack by $HBr/Br_2$ aqueous solution under the relevant working conditions, e.g., at a temperature of 50° C.; under these conditions, HDPE is severely damaged.

We have now found that HDPE can serve as a structural material in energy storage devices comprising hydrogen/bromine cells, if an additive selected from the group consisting of 1-alkyl-2-alkyl pyridinium halide, 1-alkyl-3-alkyl pyridinium halide or their mixture (e.g., 2-MEPy, 3-MEPy or a mixture thereof) is added to the electrolyte, i.e., to the aqueous hydrogen bromide solution. The experimental results reported below indicate that when said additive(s) is(are) present in the electrolyte solution, then HDPE can withstand the electrolyte corrosiveness and is capable of maintaining its mechanical properties.

Accordingly, the invention also relates to an energy storage device comprising:
a plurality of hydrogen/bromine cells arranged in a stack configuration, each cell having therein spaced apart bromine and hydrogen electrodes which are in electrical contact with means for supplying electrical current to the cell and collecting electrical current generated by the cell; a separator positioned in the space between said electrodes dividing the cell into first and second compartments; and an aqueous hydrogen bromide electrolyte in which 1-alkyl-2-alkyl pyridinium halide (for example, 1-ethyl-2-methyl pyridinium bromide), 1-alkyl-3-alkyl pyridinium halide (for example, 1-ethyl-3-methyl pyridinium bromide) or a mixture thereof is present;
hydrogen storage tank and $HBr/Br_2$ aqueous electrolyte storage tank connected by means of conduits to the cell compartments; wherein at least one component of said device (e.g., a tank and/or a conduit used for electrolyte storage and circulation) is made of HDPE.

Hydrogen/Bromine cell which can be used in the energy storage device of the invention contains hydrogen electrode (which may be made of carbon covered with platinum, supported on one face of the membrane); bromine electrode (e.g., in the form of a carbon felt); cell frames made of graphite; sulfonated polytetrafluoroethylene (e.g., Nafion®) membrane; current collectors and end plates, as described, for example, in U.S. Pat. No. 4,520,081. An energy storage device based on hydrogen/bromine cells is described in US 2012/0299384; parts of such a device, which may be made of HDPE according to the present invention, include the electrolyte storage tank and electrolyte feed lines. HDPE for use in the construction of the cell preferably has a density greater than 0.941 $g/cm^3$, e.g., greater than 0.945 $g/cm^3$. For example, PE-HWST which is commercially available from SIMONA can be used.

Figure 1:
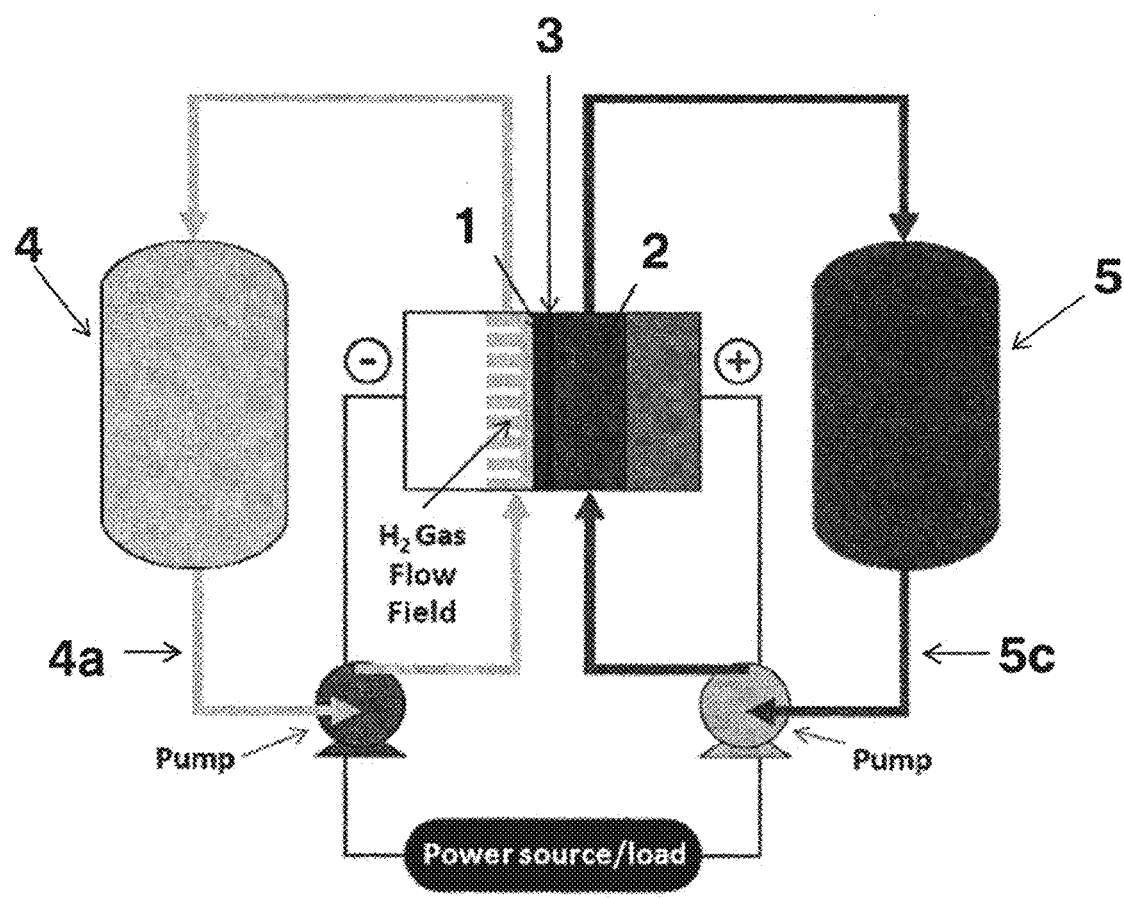
FIG. 1 illustrates the structure of a typical hydrogen/bromine cell.

The following non-limiting working examples illustrate various aspects of the present invention.

EXAMPLES

Methods
1) The specific conductivity of the hydrogen bromide acid solutions containing the complexing agents were measured at room temperature, before the addition of bromine to the samples using Innolab 740 instrument with graphite conductivity cell.

2) The temperature at which the formation of a solid phase takes place in the electrolyte solution was determined by gradually cooling the samples from RT (approximately 25-30° C.) to −15° C. The cooling regime was as follows: the temperature was decreased from RT down to 15° C. with a cooling rate of 0.2° C./min, and kept at 15° C. for 4 hours and so forth down to −15° C. At each of the following temperatures: 15° C., 10° C., 5° C., 0° C., −5° C., −10° C. and −15° C., the solution was maintained at a constant temperature for four hours. The cooling test was performed in polyethylene glycol solution, until the formation of crystals was observed.

3) The bromine concentration in the aqueous phase above the polybromide complex-oily phase was determined by a conventional iodometric titration technique. Each vial was sampled three times at room temperature.

4) The vapor pressure above the electrolyte solutions containing the complexing agents was measured at 20-26° C. according to "Vapor pressures of bromine-quaternary ammonium salt complexes for zinc-bromine battery applications" Satya N. Bajpal *J. Chem. Eng. Data* 1981, 26, 2-4.

Example 1

Preparation of 2-MEPy in Aqueous Medium

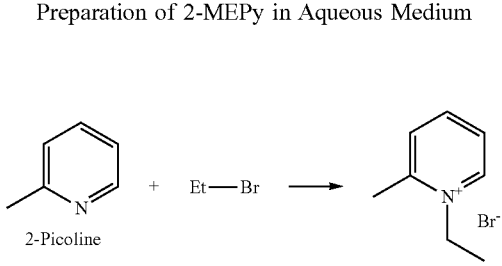

A pressure reactor was equipped with a mechanical stirrer with a magnetic relay and a thermocouple well. The reactor was purged with nitrogen, charged with 2-picoline (101.3 g) and de-ionized water (DIW) (20 mL), sealed and the mixture was heated to 92° C. Ethyl bromide (97.9 g) was slowly added during 3 hours, at 92-100° C. The mixture was heated at 94-100° C. for additional 2 hours, then cooled, and the pressure was released. The crude solution was diluted with DIW (24 mL) and excess 2-picoline was distilled-off as aqueous azeotrope, under reduced pressure. Finally, the residue was diluted with DIW. Final product: 251 g; 66.1 weight % (argentometric titration); yield, 91.5%.

Example 2

Preparation of 2-MEPy in Acetonitrile as a Solvent

A pressure reactor was equipped with a mechanical stirrer with a magnetic relay and a thermocouple well. The reactor was purged with nitrogen, charged with 2-picoline (57.9 g), ethyl bromide (69 g) and acetonitrile (69 g). The reactor was sealed and the mixture heated to 97° C. Heating at 97° C. was continued for 6 hours. Distillation of the solvent was controlled by the upper valve of the reactor followed by vacuum distillation (without cooling). DIW (31 mL) was added to dissolve the crude mixture and vacuum was applied to remove residual acetonitrile. Finally, the solution was diluted with DIW (10.5 g). Final product: 149 g; 80.0 weight % (argentometric titration); yield, 95%.

Example 3

Preparation of 2-MEPy with Excess Ethyl Bromide

A pressure reactor was equipped with a mechanical stirrer with a magnetic relay and a thermocouple well. The reactor was purged with nitrogen, charged with 2-picoline (95 g) and ethyl bromide (145 g). The reactor was sealed and the mixture heated to 97° C. Heating at 97° C. was continued for 18 hours. Distillation of excess ethyl bromide was controlled by the upper valve of the reactor followed by vacuum distillation. Finally, the solution was diluted with DIW (47 g). Final product: 250 g; 79.3 weight % (argentometric titration); yield, 96%.

Example 4

Preparation of 3-MEPy or 4-MEPy

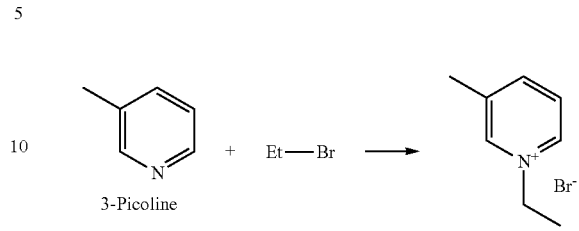

A pressure reactor was equipped with a mechanical stirrer with a magnetic relay and a thermocouple well. The reactor was purged with nitrogen, charged with 3-picoline (101.3 g) and DIW (25 mL). The reactor was sealed and the mixture was heated to 96° C. Ethyl bromide (97.9 g) was slowly added during 2 hours, at 96-104° C. The mixture was heated at 100° C. for additional 3.5 hours, after which time the pressure was released. The crude solution was diluted with DIW and excess 3-picoline was distilled-off as aqueous azeotrope, under reduced pressure. Finally, the residue was diluted with DIW. Final product: 260 g; 66.6 weight % (argentometric titration); yield, 95.6%. 4-MEPy was prepared in a similar manner, starting from 4-picoline.

Examples 5-7 (of the Invention) and 8-10 (Comparative)

Preparing and Measuring the Properties of Electrolyte Solutions which Correspond to Electrolyte Solutions at the Beginning of the Charge Stage Samples of hydrogen bromide acid solutions containing the complexing agents (abbreviated Quats), were prepared with final HBr concentration of 34% by weight, 0.8M of Quat and 0.2M of bromine, namely, with a composition corresponding to the composition of an electrolyte at the beginning of a charging process in hydrogen/bromine cell. The total volume of each sample was 12 ml in a closed vial. The samples were stored at room temperature (RT) for 24 hours after preparation before any measurement was conducted. The samples were tested for the following properties: the temperature at which a solid phase is formed in the electrolyte, free bromine concentration, conductivity and vapor pressure. The results are given in the following table:

TABLE 1

| Ex. | Quat | Temperature at which a solid phase was observed | $[Br_2]$ in aqueous phase (%) | Specific conductivity (mS/cm) | Vapor pressure (mm Hg) |
|---|---|---|---|---|---|
| 5 | 2-MEPy | 5° C. | 0.9 | 588 | 24 |
| 6 | 3-MEPy | −5° C. | 0.65 | 623 | 24 |
| 7 | BMIBr | −10° C. | 0.13 | 534 | 22 |
| 8 | 4-MEPy | 25° C. | N/A | 610 | N/A |
| 9 | MEP | 20° C. | N/A | 600 | N/A |
| 10 | MEM | 20° C. | N/A | 597 | N/A |

The results show that 2-MEPy, 3-MEPy and BMIBr are suitable for use as bromine complexing agents in electrolyte solutions of hydrogen/bromine cells at the beginning of the charge state.

Example 11-13 (of the Invention) and 14-16 (Comparative)

Preparing and Measuring the Properties of Electrolyte Solutions which Correspond to Electrolyte Solutions at the End of the Charge Stage The procedures and measurements as set forth in the previous examples were repeated. However, the amounts of HBr and elemental bromine were adjusted to form samples of electrolyte solutions that represent the composition of the electrolyte at the end of the charge process. Hence, samples were prepared with final HBr concentration of 22% by weight, 0.8M of Quat and 1M of bromine. The total volume of each sample was 12 ml in a closed vial. The samples were stored at room temperature for 24 hours after preparation before any measurement was conducted. The samples were tested for the following properties: the temperature at which a solid phase is formed in the electrolyte, free bromine concentration, conductivity and vapor pressure. The results are shown in Table 2.

TABLE 2

| Ex | Quat | solidification temperature | [$Br_2$] in aqueous phase (%) | Specific conductivity (mS/cm) | Vapor pressure (mm Hg) |
|---|---|---|---|---|---|
| 11 | 2-MEPy | −10° C. | 1.05 | 582 | 21 |
| 12 | 3-MEPy | −10° C. | 0.99 | 605 | 18 |
| 13 | BMIBr | −7° C. | 0.85 | 530 | 19 |
| 14 | 4-MEPy | 25° C. | N/A | 597 | N/A |
| 15 | MEP | 5° C. | 1.21 | 593 | 24 |
| 16 | MEM | 5° C. | 2.14 | 591 | 30 |

The results show that 2-MEPy, 3-MEPy and BMIBr are suitable for use as bromine complexing agents in electrolyte solutions of hydrogen/bromine cells at the end of the charge stage.

Examples 17-21 (of the Invention) and 22-23 (Comparative)

In this set of examples, various mixtures of complexing agents were tested in electrolyte solutions having a composition which corresponds to the composition of an electrolyte solution at the beginning of the charge process (see the procedure of Examples 5-10). The results are tabulated in Table 3.

TABLE 3

| Ex | Quats mixture | Quats ratio | solidification temperature | [$Br_2$] in aqueous phase (%) | Specific conductivity (mS/cm) | Vapor pressure (mmHg) |
|---|---|---|---|---|---|---|
| 17 | 2-MEPy/3-MEPy | 3:1 | −5° C. | 0.93 | 561 | 22 |
| 18 | 2-MEPy/3-MEPy | 1:1 | −10° C. | 0.81 | 456 | 35 |
| 19 | 2-MEPy/3-MEPy | 1:3 | −10° C. | 0.49 | 600 | 36 |
| 20 | 2-MEPy/3-MEPy/4-MEPy | 1:1:1 | −10° C. | 1.38 | 598 | — |
| 21 | 2-MEPy/4-MEPy | 3:1 | −5° C. | 0.8 | 572 | — |
| 22 | 2-MEPy/4-MEPy | 1:1 | 20° C. | N/A | N/A | N/A |
| 23 | 2-MEPy/4-MEPy | 1:3 | 20° C. | N/A | N/A | N/A |

Examples 24-29 (of the Invention) and 30 (Comparative)

In this set of examples, various mixtures of complexing agents were tested in electrolyte solutions having a composition which corresponds to the composition of an electrolyte solution at the end of the charge process (see the procedure of Examples 11-16). The results are tabulated in Table 4.

TABLE 4

| Ex | Quats mixture | Quats ratio | solidification temperature | [$Br_2$] in aqueous phase (%) | Specific conductivity (mS/cm) | Vapor pressure (mmHg) |
|---|---|---|---|---|---|---|
| 24 | 2-MEPy/3-MEPy | 3:1 | −10° C. | 1.12 | 569 | 27 |
| 25 | 2-MEPy/3-MEPy | 1:1 | −10° C. | 0.88 | 562 | 34 |
| 26 | 2-MEPy/3-MEPy | 1:3 | −10° C. | 1.16 | 566 | 38 |
| 27 | 2-MEPy/3-MEPy/4-MEPy | 1:1:1 | −10° C. | 1.12 | 576 | — |
| 28 | 2-MEPy/4-MEPy | 3:1 | −10° C. | 0.92 | 571 | 43 |
| 29 | 2-MEPy/4-MEPy | 1:1 | −5° C. | 1.25 | — | — |
| 30 | 2-MEPy/4-MEPy | 1:3 | 20° C. | — | — | — |

Examples 31-36

Samples were prepared with HBr concentration of 10% by weight. The complexing agent that was tested was 2-MEPy. The concentration of 2-MEPy in each sample was 0.8M. Different amounts of elemental bromine were added to the samples and some properties of interest (the concentration of elemental bromine in the aqueous phase, the conductivity and vapor pressure) were measured at two temperatures: 22° C. and 45° C.

The following is noted with respect to the measurements relevant to this set of examples (31-36) and the next two sets of examples (37-42 and 43-48):

The samples were stored at 25° C. for at least 24 hours after preparation before any measurement was conducted.

Conductivity measurements were carried out at 22-24° C. on solutions which contain bromine.

Sample preparations for iodometric titration and the titration itself were done at 22-24° C.

The equilibrium total pressure above the electrolyte at the desired temperature has been measured using mercury manometer vs equilibrium pressure of liquid for which exact values of equilibrium vapor pressure are well known in all range of temperatures. Distillated water was used as the reference. Two round-bottom flasks of the same volume and with the same volume of the measured electrolyte and water, closed by vacuum valves, were connected to the mercury manometer. Each flask was accurately equilibrated at the desired temperature and the vacuum valves were opened. After the system was equilibrated the difference between the levels of mercury in both side of manometer tube was measured. The accurate value of water pressure at temperature of water flask is known. The measured difference in mercury levels has been added to this value.

The results are tabulated in Table 5.

TABLE 5

| Ex. | Br$_2$, M added | [Br$_2$] in aqueous phase (%) | Conductivity, mS/cm | Vapor pressure at 22° C., mmHg | Vapor pressure at 45° C., mmHg |
|---|---|---|---|---|---|
| 31 | — | — | 352 | 17 | 78 |
| 32 | 1.0 | 0.42 | 479 | — | — |
| 33 | 1.5 | 0.79 | 480 | — | — |
| 34 | 2 | 1.92 | 485 | 10 | 63 |
| 35 | 2.5 | 3.72 | 481 | 14 | 77 |
| 36 | 3 | 6.07 | 479 | 18 | 82 |

Examples 37-42

Samples were prepared with HBr concentration of 10% by weight. The complexing agent that was tested was a mixture consisting of 2-MEPy and 3-MEPy at molar ratio of 3:1. The concentration of the mixture of 2-MEPy and 3-MEPy in each sample was 0.8M. Different amounts of elemental bromine were added to the samples and some properties of interest (the concentration of elemental bromine in the aqueous phase, the conductivity and the vapor pressure) were measured at three temperatures: 22° C., 45° C. and 60° C. The results are tabulated in Table 6.

TABLE 6

| Ex. | Br$_2$, M added | [Br$_2$] in aq. phase (%) 22° C. | [Br$_2$] in aq. phase (%) 45° C. | Cond. mS/cm | Vapor pressure at 22° C., ±1 mmHg | Vapor pressure at 45° C., ±2 mmHg | Vapor pressure at 60° C., ±3 mmHg |
|---|---|---|---|---|---|---|---|
| 37 | — | | | 365 | 15 | 80 | 165 |
| 38 | 1.0 | 0.64 | 0.75 | 460 | — | — | — |
| 39 | 1.5 | 0.95 | 1.20 | 478 | — | — | — |
| 40 | 2 | 1.17 | 2.73 | 475 | — | — | — |
| 41 | 2.5 | 2.79 | 5.31 | 467 | 16 | 75 | 176 |
| 42 | 3 | 5.16 | 8.76 | 462 | 17 | 77 | 185 |

Examples 43-48

Samples were prepared with HBr concentration of 10% by weight. The complexing agent that was tested was a mixture consisting of 2-MEPy and 3-MEPy at molar ratio of 1:3. The concentration of the mixture of 2-MEPy and 3-MEPy in each sample was 0.8M. Different amounts of elemental bromine were added to the samples and some properties of interest (the concentration of elemental bromine in the aqueous phase, the conductivity and the vapor pressure) were measured at three temperatures: 22° C., 45° C. and 60° C. The results are tabulated in Table 7.

TABLE 7

| Ex. | Br$_2$, M added | [Br$_2$] in aq. phase (%) 22° C. | [Br$_2$] in aq. phase (%) 45° C. | Cond. mS/cm | Vapor pressure at 22° C., mmHg | Vapor pressure at 45° C., mmHg | Vapor pressure at 60° C., mmHg |
|---|---|---|---|---|---|---|---|
| 43 | — | | | 380 | 17 | 74 | 158 |
| 44 | 1.0 | 0.69 | 1.90 | 463 | — | — | — |
| 45 | 1.5 | 0.94 | 1.79 | 472 | — | — | — |
| 46 | 2 | 1.40 | 2.15 | 475 | — | — | — |
| 47 | 2.5 | 2.82 | 5.56 | 465 | 17 | 67 | 170 |
| 48 | 3 | 6.66 | 8.36 | 466 | 17 | 70 | 183 |

It is apparent from Tables 5, 6 and 7 that at temperatures of 22° C. and 45° C., the increase at the amount of elemental bromine in the electrolyte does not result in an increase of the vapor pressure, indicating that the additives of the invention form strong complexes with the elemental bromine in HBr solutions. It should be noted that at a temperature of 60° C. a small increase of the vapor pressure is observed, but this temperature is beyond the temperature range at which electrochemical cells normally operate.

Example 49 (Comparative) and Example 50 (of the Invention)

HDPE test specimens (PE-WHST™ with density of 0.947 g/cm$^3$, available from SIMONA) were exposed to aqueous HBr solutions which contain elemental bromine under the experimental conditions set forth below and were then subjected to various tests. The average dimensions of the test specimens were as follows: length—6.2 cm; width—1.2 cm; thickness—0.3 cm.

In a first set of experiments, a test specimen was immersed in 200 ml aqueous solution which contains hydrogen bromide and elemental bromine at concentrations of 10 wt % and 3M, respectively. The solution was heated to 50° C. under reflux. The solution was maintained under stirring at 50° C. for a period of time of 30 days, following which the test specimen was removed from the solution.

A second set of experiments was carried out similarly to the first one, with the difference that a mixture of 2-MEPy and 3-MEPy at a concentration of 0.8M was present in the solution. The molar ratio between 2-MEPy and 3-MEPy in the mixture was 3:1.

The test specimen which was removed from the solution was inspected visually, to evaluate color and structural changes occurring on the surface of the specimen. The test specimen was also weighed immediately at the end of the experiment. The mechanical stability of the test specimens was assessed by comparing the (average) impact strength with that of a reference specimen; the impact strength was measured using the Izod notched test (ASTM D-256-92 with pendulum of 10.8 J). The experimental conditions and results are tabulated in Table 8. Examples 49 and 50 correspond to the first and second sets of experiments, respectively.

TABLE 8

| Example | 49(comparative) | 50 |
|---|---|---|
| Experimental conditions | | |
| Test specimen | HDPE | HDPE |
| Composition of the aqueous solution | HBr 10 wt %<br>Br$_2$ 3M | HBr 10 wt %<br>Br$_2$ 3M<br>2-MEPy + 3-MEPy |
| Temperature | 50° C. | 50° C. |
| Properties of the specimen | | |
| Visible properties | Color change from white- to- reddish brown; Blisters were formed on the surface of the specimen | Color change from white to yellow-orange; surface remained unchanged |
| weight change (%) | 13.41$^a$ | 2.4$^c$ |
| Impact strength (Izod notched J/m) | 679$^a$<br>(Reference: 622$^b$) | 638$^c$<br>(Reference: 636d) |

Figure 2:
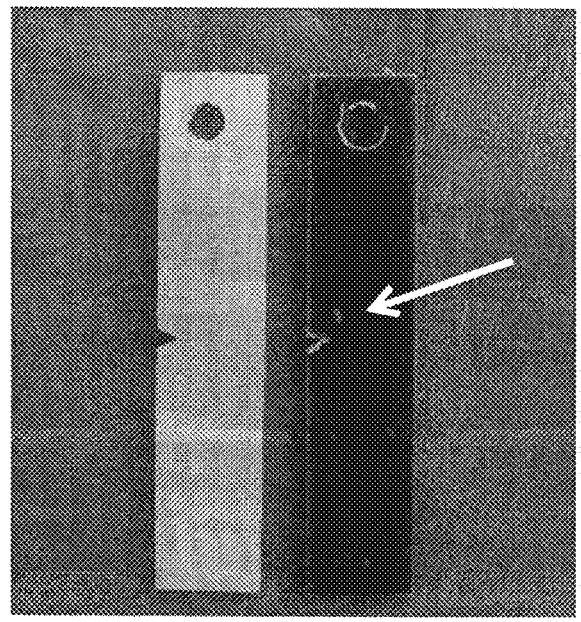
FIG. 2 is photograph of a reference white test HDPE specimen and a test specimen following exposure to an electrolyte solution which contains HBr and bromine.

$^a$the average of 10 measurements
$^b$the average of 10 measurements
$^c$the average of 10 measurements
dthe average of 10 measurements Regarding the results of Example 49, it is noted that HDPE test specimens exposed to bromine-containing aqueous hydrogen bromide solutions absorbed an appreciable amount of elemental bromine, as indicated by the severe color change and the large increase in the weight of the specimen. FIG. 2 is photograph of a reference white test specimen and a typical test specimen obtained following the experiment (on the left and right sides of the photograph, respectively; the photograph was taken before the Izod notched test). The photograph shows the severe color change. In addition, the surface of the HDPE test specimen was seriously damaged, as indicated by the formation of small blisters marked by an arrow in FIG. 2, i.e., small "pockets" with liquid trapped therein.

Figure 3:
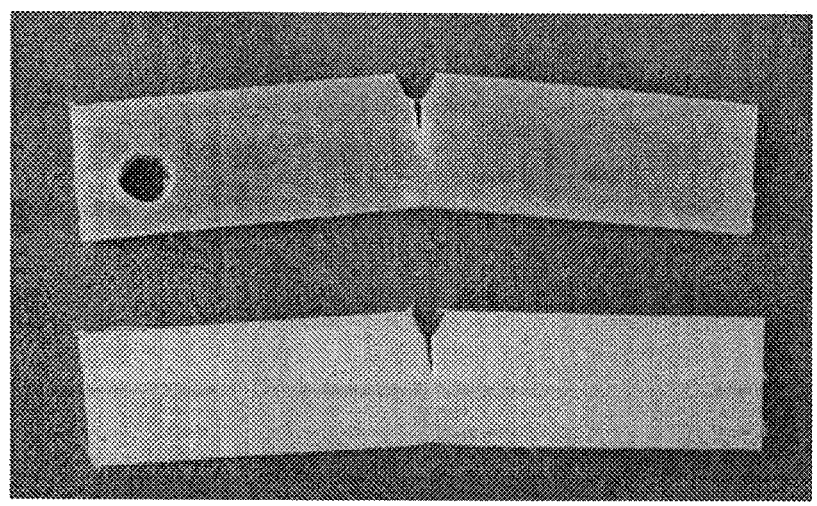
FIG. 3 is photograph of a reference white test HDPE specimen and a test specimen following exposure to an electrolyte solution which contains HBr, bromine and the additives of the invention.

Regarding the results of Example 50, it is noted that in the presence of the complexing agents, the resistance of HDPE to the electrolyte is markedly improved. The amount of bromine absorbed by the HDPE test specimen is acceptable, as indicated by a small increase in the weight of the specimen and the white-to-yellow/orange color change. FIG. 3 is photograph of a reference, white test specimen and a typical test specimen obtained following the experiment (on the lower and upper sides of the photograph, respectively; the photograph was taken after the Izod notched test). No damage is observed on the surface of the HDPE test specimen. Furthermore, HDPE exposed to elemental bromine in the presence of the complexing agents retains its mechanical strength as indicated by the fact that the impact strength of the reference specimen and the test specimen are comparable.

The invention claimed is:

1. An electrolyte suitable for use in an electrochemical flow cell, said electrolyte comprising aqueous hydrogen bromide and a liquid complex composed of at least one of 1-alkyl-2-methyl pyridinium halide or 1-alkyl-3-methyl pyridinium halide combined with one or more bromine molecules, wherein the alkyl groups are independently selected from the group of C1-C5 alkyl, wherein said electrolyte is configured for circulation in a hydrogen/bromine cell.

2. An electrolyte according to claim 1, comprising a liquid complex composed of at least one of 1-ethyl-2-methyl pyridinium bromide or 1-ethyl-3-methyl pyridinium bromide, combined with one or more bromine molecules.

3. An electrolyte according to claim 2, comprising a mixture of 1-ethyl-2-methyl pyridinium bromide and 1-ethyl-3-methyl pyridinium bromide.

4. A process for operating an electrochemical flow cell selected from the group consisting of hydrogen/bromine or vanadium/bromine cells, comprising adding to HBr-containing electrolyte solution of said cell an additive selected from the group consisting of 1-alkyl-2-methyl pyridinium halide, 1-alkyl-3-methyl pyridinium halide or their mixture, wherein the alkyl groups are independently selected from the group of C1-C5 alkyl.

5. A process according to claim 4, comprising adding 1-ethyl-2-methyl pyridinium bromide, 1-ethyl-3-methyl pyridinium bromide or a mixture thereof to the HBr-containing electrolyte in hydrogen/bromine cell.

6. An energy storage device comprising:
a plurality of hydrogen/bromine cells arranged in a stack configuration, each cell having therein spaced apart bromine and hydrogen electrodes which are in electrical contact with means for supplying electrical current to the cell and collecting electrical current generated by the cell; a separator positioned in the space between said electrodes dividing the cell into a first and second compartments; and an aqueous hydrogen bromide electrolyte in which 1-alkyl-2-methyl pyridinium halide, 1-alkyl-3-methyl pyridinium halide or a mixture thereof is present, wherein the alkyl groups are independently selected from the group of C1-C5 alkyl;
hydrogen storage tank and HBr/Br$_2$ aqueous electrolyte storage tank connected by means of one or more conduits to the cell compartments;
wherein at least one component of said device comprises high density polyethylene (HDPE).

7. An energy storage device according to claim 6, wherein the electrolyte storage tank and/or conduit(s) used for electrolyte circulation comprise HDPE.

8. An energy storage device according to claim 6, wherein the 1-alkyl-2-methyl pyridinium halide and 1-alkyl-3-methyl pyridinium halide are 1-ethyl-2-methyl pyridinium bromide and 1-ethyl-3-methyl pyridinium bromide, respectively.

* * * * *